Nov. 15, 1960 F. C. MOCK 2,960,271
DENSITY COMPENSATING DEVICE FOR FUEL SYSTEMS
Original Filed Dec. 13, 1946 3 Sheets-Sheet 1

INVENTOR.
FRANK C. MOCK
BY J.C. Wiessler
ATTORNEY

Nov. 15, 1960  F. C. MOCK  2,960,271
DENSITY COMPENSATING DEVICE FOR FUEL SYSTEMS
Original Filed Dec. 13, 1946  3 Sheets-Sheet 3

INVENTOR
FRANK C. MOCK
BY
J. C. Wiessler
ATTORNEY

United States Patent Office 2,960,271
Patented Nov. 15, 1960

2,960,271

DENSITY COMPENSATING DEVICE FOR FUEL SYSTEMS

Frank C. Mock, South Bend, Ind., assignor to The Bendix Corporation, a corporation of Delaware Original application Dec. 13, 1946, Ser. No. 716,154, now Patent No. 2,689,606, dated Sept. 21, 1954. Divided and this application Mar. 18, 1954, Ser. No. 417,043

2 Claims. (Cl. 236—92)

This application constitutes a division of my copending application Serial No. 716,154, filed December 13, 1946, now Patent No. 2,689,606.

This invention relates to connecting means between driving and driven members and to a novel bearing for mounting same, and more particularly it relates to a sealed and floating bearing member in which a shaft is adapted to move. Although my invention is illustrated in combination with density compensating means in a fuel feeding system for gas turbine engines, it will be apparent to persons skilled in the art that it is available for many other uses.

One of the primary objects of this invention is to provide a novel bearing as a new article of manufacture.

Another important object of this invention is to provide a novel bearing and housing means therefor in floating and/or sealing relation.

Another object of the present invention is to provide novel sealing and anti-friction means adapted for use in pressure and/or temperature compensating mechanism for engines.

Another object of this invention is to provide a low torque, anti-friction, sealed and floating connection between elements of mechanism operable in fluids having widely variant pressure levels.

A further object of this invention is to provide density compensating mechanism for an engine fuel control device having highly efficient and accurately machined connecting means between an aneroid element and a fuel flow control element.

A further object is to generally improve the working mechanism in fuel feeding systems of the type disclosed in patents numbered 2,581,275, filed October 9, 1944, and 2,581,276, filed May 30, 1945, of Frank C. Mock.

The foregoing and other objects and advantages will become apparent in view of the following description taken in conjunction with the appended drawings, in which.

Figure 1:
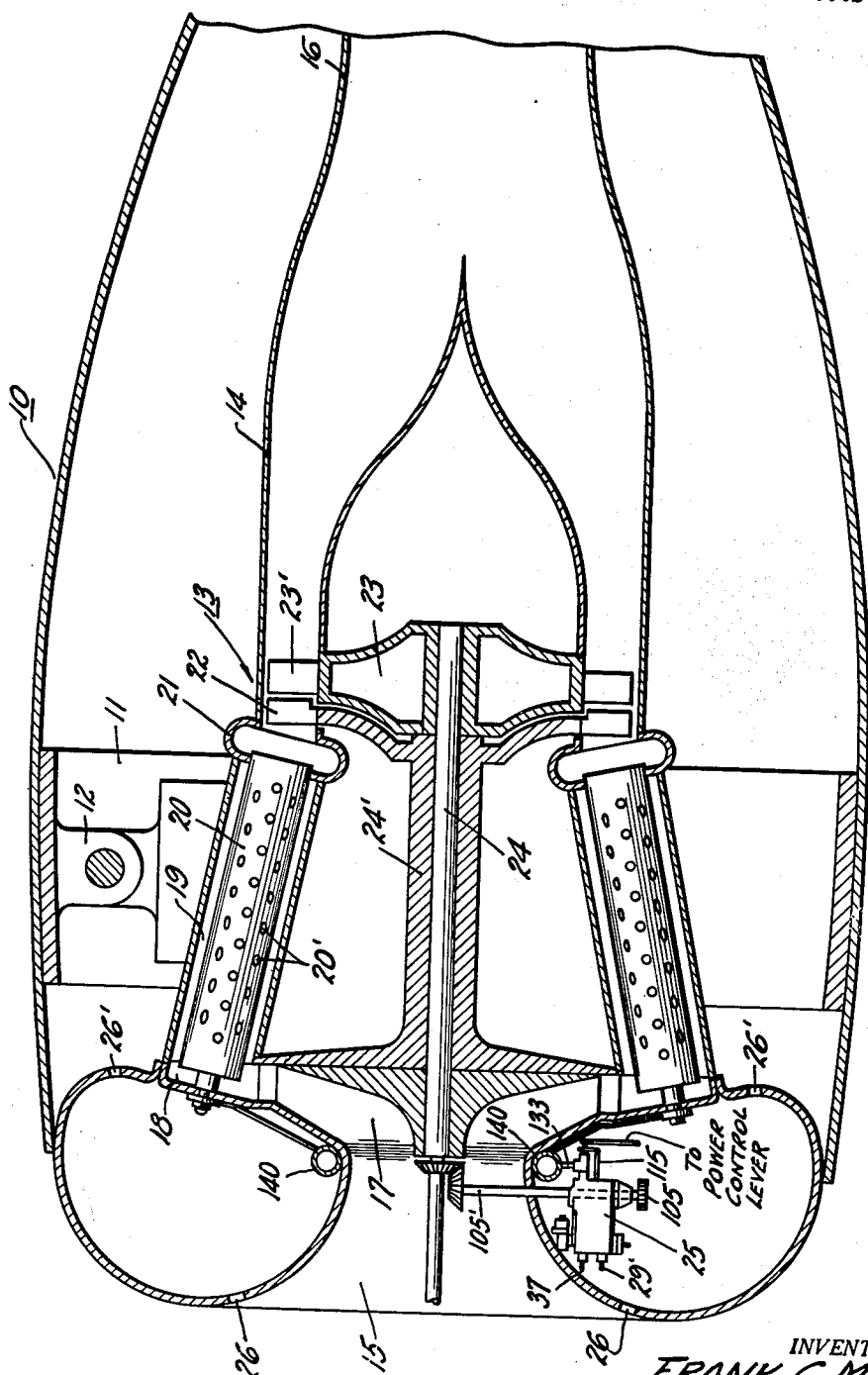
Figure 1 is a substantially central longitudinal sectional view of a jet propulsion power plant or engine incorporating a fuel feed and power control system which includes the present invention.
Figure 2:
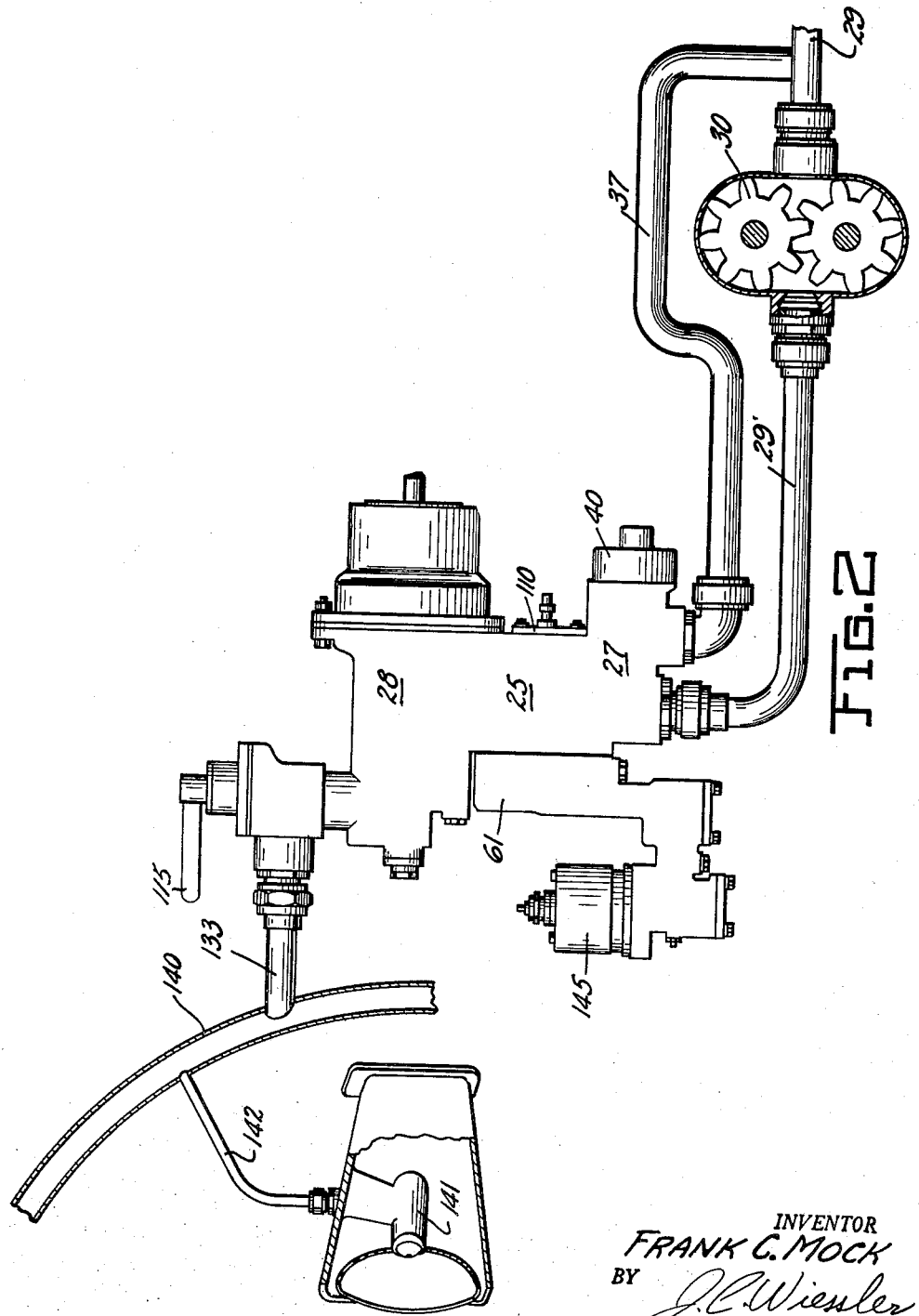
Figure 2 is a simplified schematic view in elevation and partly in section of the fuel metering and power control unit indicated at 25 in Figure 1 and described in full detail in my parent copending patent, supra.

Referring first to Figure 1, an aircraft engine nacelle is indicated at 10 and has supported therein as by means of ring 11 and brackets 12 a jet propulsion engine or power plant generally indicated at 13 and including an outer casing 14, contoured at its front extremity to define an air inlet 15 and at its rear extremity to define a reaction tube 16. A dynamic compressor 17 (shown as a centrifugal blower but which may be of the axial flow type) forces air into an annular header 18 which directs it to a plurality of peripherally spaced cylinder-like generators or burner chambers 19 containing burners 20 having air inlet holes 20' in the peripheral walls thereof. The burners 20 discharge into a collector ring 21 arranged to deliver the hot air and products of combustion through a set of stationary directing blades 22 against the blades 23' of a turbine rotor 23. The turbine 23 and air compressor 17 are mounted on a common shaft 24 rotatably supported by a bearing 24'. Air entering the inlet 15 is picked up by the compressor, which acts to direct the air into chamber 18 and generator chamber 19, and thence into the burners 20 through holes 20', where heat is added by the combustion of fuel. The expanded air and products of combustion are directed against the blades 23' of the turbine 23 to drive the compressor and are then discharged to the atmosphere through the reaction tube 16 to effect propulsion of the plane. If desired, propulsion of the plane may also be accomplished by a propeller driven off of a forward extension of shaft 24, usually through suitable reduction gearing, not shown.

The fuel metering and power control device, or the housing therefor, is generally indicated at 25; for the purpose of illustration it is shown as installed in the annular chamber defined by the front extremity of the casing 14 in Figure 1 and which chamber is vented to atmospheric air or ram pressure by means of openings 26 and 26'. The device in the main comprises a regulator section 27, herein shown in detail in Figure 3, and a control or governor section 28 which is fully disclosed in my parent copending patent, supra. Fuel is supplied under pressure to the regulator by way of a conduit 29, 29' having mounted therein suitable fuel pressurizing means such as an engine driven fuel pump 30, the conduit 29' discharging into control inlet chamber 31 (see Figure 3). The pressure in chamber 31 is maintained at a predetermined value by means of a by-pass valve 32 which is preferably in the form of a hollow shell having inlet ports 33 at one end thereof, said valve being mounted to slide in a cage 34 removably secured in a housing 35 defining a chamber 36 which is ported to a conduit 37 leading back to the low pressure side of the pump 30. Valve 32 is connected to a stem bolt 38 which in turn is removably connected to a diaphragm 39 having its peripheral edge portion clamped between a cap 40 and a boss 40' projecting from the adjacent portion of the housing 25. Cap 40 is formed with a chamber 41 in which is mounted a spring 42 exerting a predetermined closing thrust on the by-pass valve 32. Chamber 41 is vented to the chamber 31 and to the fuel discharge side of the metering and governor control unit 28 by means of ducts 43 and 43' having restrictions 44 and 45 therein for regulating flow through the balance pressure circuit provided by ducts or passages 43 and 43'. The effective area of the diaphragm 39 is preferably substantially the same as that of the valve 32, and hence the fuel supply pressure in chamber 31 will be maintained at a constant value above metered fuel or nozzle discharge pressure as determined by the strength of spring 42, or in other words, there will be a constant pressure drop across the regulator section 27 and governor control section 28.

A maximum pressure relief valve 46 is carried by and slidably mounted in the valve 32 and is adapted to seat in and normally close a port 47 formed in the latter valve, the valve 32 being ported at 48 to the valve chamber 36. A spring 49 determines the pressure at which valve 46 will unseat. This valve 46 prevents build-up of excessive pressures due to abutting off the flow of fuel to the burners while the engine is running, and other causes.

The regulator 27 comprises a regulator valve 51 which is preferably in the form of a hollow cylinder having a plurality of metered discharge ports 52 at one end thereof, said valve being slidingly mounted in a cage 53, ported at 54 to a chamber 55 formed in housing 56, said chamber 55 being open to the chamber 31 for inflow of fuel from the latter chamber.

A metering head diaphragm is indicated at 60; it is clamped at its outer or periphereal edge between a casting 61 and an adjacent flange formed on the main housing or casting 25, and at its central portion between plates 62 and 63 provided with hub portions 62′ and 63′; it constitutes a flexible wall between a compensating pressure chamber C and an unmetered fuel pressure chamber D. The hub 62′ is constructed to releasably receive the disc shaped head of a hollow valve stem 64 having a flexible member such as a short length of cable projected therethrough and connected at its opposite ends, respectively, to the said stem 64 and the adjacent end of a stem bolt 64′, the latter being connected to the valve 51. The cable provides a flexible connection between the valve 51 and diaphragm 60. The hub 63′ of plate 63 is shaped to provide a cylindrical guide which is slidingly engaged in a bushing 65 inserted in a chamber 66 formed in the casting 61. A spring 67 is mounted in the chamber 66 and at its inner end bears against and is centered by the hub 62′ of the diaphragm plate 62.

Access may be had to the regulator valve assembly through an opening in the main housing or casting 25 provided with a cap or cover 110 carrying an adjustable stop 111 which positively limits movement of the regulator valve 51 in a valve opening direction.

The governor and metering control section 28, which is disclosed in detail in my parent copending patent, supra, includes a fuel metering valve which is balanced between a governor spring speed selecting means and engine driven centrifugal force generating weight means during equilibrium operation of the engine at any given pilot selected speed, for controlling the fuel flow to the engine burners and thereby engine speed. The regulator valve 51 and air density compensating means 145, to be described, coact to control the fuel pressure differential or metering head across the governor valve. A lever 98, the bottom portion of which is shown bearing against one end of valve stem bolt 64′ in a valve opening direction, is subjected to the force output of other engine driven weight means in governor section 28 for imposing a force on valve 51 which varies in proportion to the square of engine speed. The regulator valve 51 always assumes such a position that the fuel force acting across diaphragm 60 is controlled to balance the force output of lever 98 on the valve. The metering head across the governor valve is thereby controlled to also vary in proportion to the square of engine speed (see my parent copending patent, supra). A pilot's control lever 115 is provided and is operatively connected to the governor spring for selecting an operating speed for the engine. A conduit 133 connects a metered fuel chamber downstream of the governor section 28 to an annular manifold or fuel distributor ring 140, from which fuel is supplied to the individual burner nozzles 141 by way of fuel lines 142.

To compensate or correct the metering differential across the governor valve for changes in air density, an aneroid assembly 145 is provided and includes a spring loaded bellows or capsule 146 which is anchored at one end to a bushing 147 carried by an outer case or housing, and at its opposite or movable end is connected to a cup-shaped member 148 secured to a connecting and guide rod 149 encircled by a loading spring 150 acting counter to another loading spring 150′ within the bellows. By using a pair of coacting springs, as shown, travel of the aneroid is calibrated to produce the desired travel of guide rod 149. The bellows 146 may be loaded for response to changes in both pressure and temperature (see Patent No. 2,376,711 to F. C. Mock) and is preferably located where it will be subjected to ram or compressor inlet pressure. The rod 149 is pivotally connected to the one end of a lever 151, the opposite end of said lever being secured on the outer end of a shaft 152, journaled in a sealed bearing sleeve 153 supported by a housing 154 forming part of the casting 61. The outer or left-hand end of shaft 152 is shouldered and engages a thrust bearing 153′. The inner end of shaft 152 projects into a chamber 155 and has secured thereon a lever 156 which is pivotally and adjustably connected by means of a screw 157′ to the one end of a needle valve 157 mounted for sliding movement in a bushing 158 and contoured at its opposite end to regulate flow of fuel through a port 159. A passage 160 communicates unmetered fuel chamber D with compensating fuel chamber C and has therein a calibrated jet 161; fuel may flow from chamber C to the metered fuel chamber, to which conduit 133 is connected downstream of the governor valve, by way of passage 162, port 159 and passage 163. To ensure free movement of needle 157, fuel may flow through annular passage 164 to a chamber 165 formed in a bushing 166 surrounding the lower or outer extremity of said needle and thence to chamber 155 between the end of the needle and a jam nut 167. The needle body is also grooved as at 168 to facilitate lubrication and prevent binding from sediment and reduce friction.

The particular method of mounting the shaft 152 as shown provides an effective seal against leakage of fuel from chamber 155 outwardly past the said shaft and its bearing sleeve 153 and at the same time reduces the resistance to torque to a minimum. The shaft may have a bearing fit in sleeve 153 of, for example, .0002″ or less, and the sleeve itself is formed with a pair of grooved enlargements at the opposite ends thereof. The groove in each of said enlargements houses a flexible ring seal 169 which provides a sealed and floating mounting for said sleeve in housing 154; i.e. the outer circumference of each grooved enlargement is maintained out of contact with housing 154 by the flexible sealing and float mounting elements 169 which may, for example, be O or square section hard rubber rings. Between the enlarged ends of the sleeve is an annular space or chamber 169′, which is vented to the inner bearing surface of the sleeve and is adapted to receive a suitable lubricant upon removal of cap 169″. The floating mounting which is provided by the sleeve 153 and the cooperating element 169 permits the use of different metals in the sleeve and housing, for example steel and aluminum, having different coefficients of expansion, without danger of binding the shaft 152.

During operation of a gas turbine engine, a decrease, for example in the density of air flowing to the engine, results in a decrease in the fuel required to drive the turbine and compressor at a given speed, and unless the maximum rate of fuel delivered to the engine during an acceleration thereof is correspondingly reduced, much higher burner temperatures will be experienced at altitude than at sea level due to the extremely rich fuel-air ratio. For an engine of the type herein described, the fuel rate required to maintain a given speed varies approximately directly with the entering air density. If a pilot or operator were to carefully "nurse" the power control lever 115 during acceleration and adjust the governor valve in a manner such that the rate of fuel feed increases in direct relation to engine speed, compensation for changes in density by regulating the differential across the governor valve would not be necessary, but the control would then be so sensitive to slight changes as to be impractical. It is of considerable advantage for a pilot to be able to rapidly move the governor valve between its low and high speed positions without fear of damage to the burner system or turbine, irrespective of the altitude of engine operation.

Figure 3:
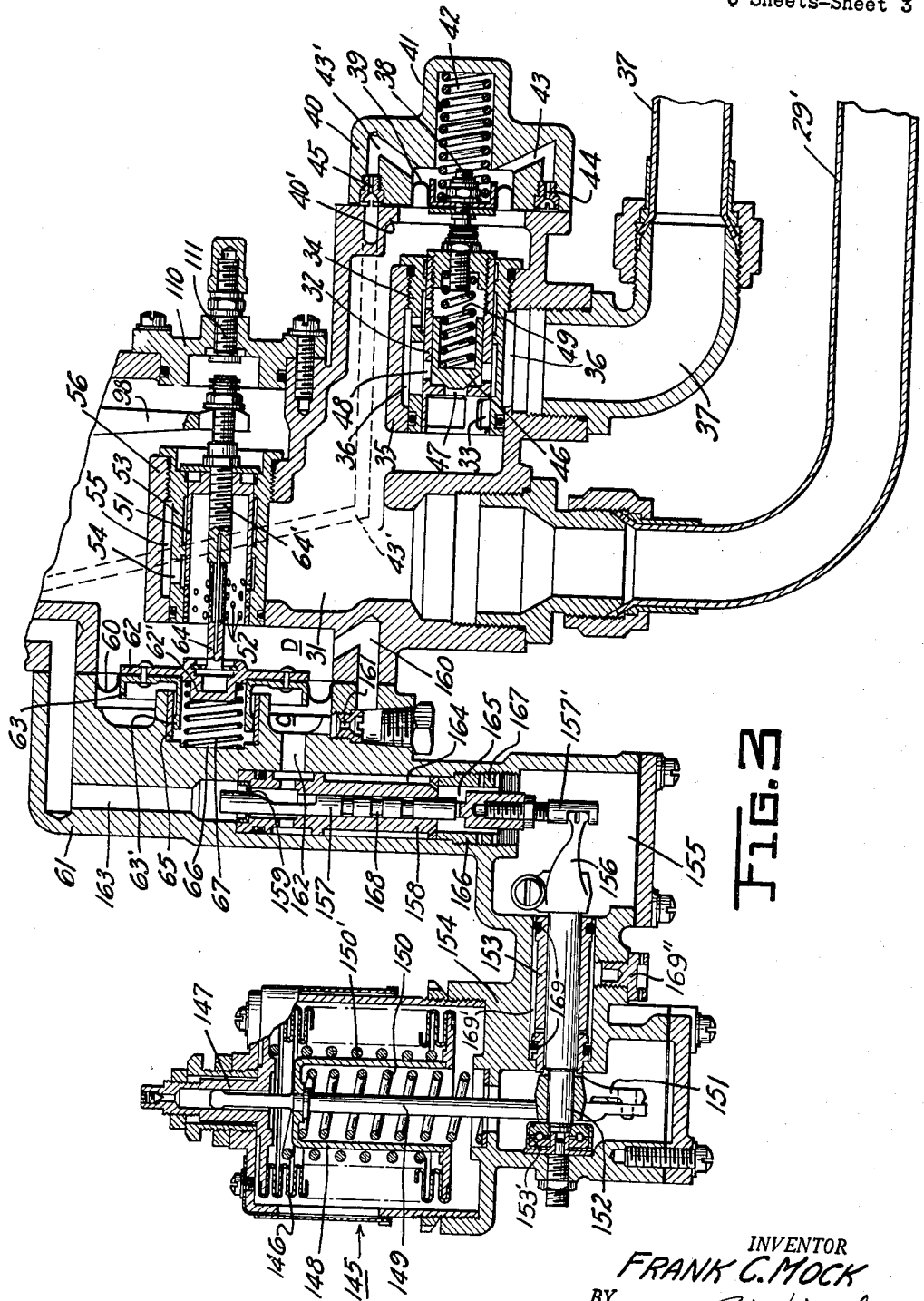
Figure 3 is an enlarged sectional schematic view of the lower or regulator section of Figure 2.

The density control circuit is shown in Figure 3; it comprises the passage 160, jet 161, passage 162, variable restriction or port 159 controlled by needle valve 157, and passage 163 opening the metered fuel chamber downstream of the governor valve. A decrease in entering air density causes elongation of the bellows 146 and rotation of shaft 152 in sleeve 153 in a direction which causes an increase in the area of the orifice 159; an increase in density has the opposite effect. For a given engine or turbine speed, the differential across the metering head diaphragm 60 will be constant, and hence the flow through the control jet 161 will remain constant. All flow of fuel through the jet 161 will pass through the orifice 159, and hence the drop across the latter orifice will vary as the square of its area, and for a fixed or given position of the needle 157 (constant density), the drop across the orifice 159 will be proportional to the drop across the jet 161. The sum of the drops across the orifice 159 and the diaphragm 60 (or jet 161) is always substantially equal to the drop across the governor valve, and at a given density the total drop will be proportional to the square of engine speed. If the effective area of orifice 159 is enlarged, there will be a corresponding decrease in the drop across this orifice and a reduction in head across the governor valve, resulting in a diminished flow of fuel to the burners for a given metering area at the governor valve. Thus, if the governor valve is opened for acceleration at certain altitudes, less fuel will be supplied to the burners than would be the case at ground level or at some lower altitude. By suitably contouring the needle 157, substantially complete density compensation may be obtained, and this advantage is not only present in acceleration and deceleration, but it also will maintain a given engine or turbine speed at all altitudes for any fixed or given position of the power control lever 115.

It will now be apparent to those skilled in the art that I have provided a low-torque, lapped seal, friction-free journal, rotatable in a sealed and floating bearing, and particularly adapted for use in systems wherein substantial fluid pressure drops must be sustained across the journal and bearing without fluid leakage therethrough and without binding between the journal and bearing.

I claim:

1. In a fuel feeding device for an engine, an altitude compensating system including a fuel flow passage for flowing fuel of relatively high pressure having a port or restriction therein, a valve arranged to control said port or restriction, an aneroid subjected to relatively low fluid pressure, and means operatively connecting said aneroid to said valve including a rotatable shaft having its outer end connected to said aneroid and its inner end connected to said valve, a sleeve providing a bearing for said shaft, said sleeve being so closely fitted as to prevent any appreciable fuel leakage thereacross while permitting free rotation of said shaft therein, a housing supporting said sleeve and shaft, means providing a sealed and floating mounting for said sleeve in said housing to prevent leakage of fuel outwardly and at the same time permit relative expansion between the sleeve and housing, and a thrust bearing between the outer end of said shaft and the adjacent wall of the housing, said bearing opposing unbalanced endwise pressure on said shaft.

2. In a fuel feeding device for an engine, density compensating means including a flow passage having a port or restriction therein, a valve adapted to be positioned in an axial direction to control said port or restriction, an expansible element responsive to changes in pressure and/or temperature of the air flowing to the engine, and means operatively connecting said element to said valve including a rotatable shaft, lever means connecting the outer end of said shaft to said element, lever means connecting the inner end of said shaft to said valve, a sleeve providing a lapped seal bearing for said shaft, a housing supporting said sleeve and shaft, and means providing a sealed and floating mounting for said sleeve in said housing.

References Cited in the file of this patent

UNITED STATES PATENTS

| 1,150,485 | Bentley | Aug. 17, 1915 |
| 1,598,157 | Seibel | Aug. 31, 1926 |
| 1,728,434 | Montrevil | Sept. 17, 1929 |
| 1,761,300 | Hemings | June 3, 1930 |
| 1,840,218 | Waddell | Jan. 5, 1932 |
| 1,884,929 | Veenschoten | Oct. 25, 1932 |
| 1,936,379 | Child | Nov. 21, 1933 |
| 2,393,405 | Page | Jan. 22, 1946 |
| 2,471,725 | Clifford | May 31, 1949 |

FOREIGN PATENTS

| 603,075 | France | Jan. 6, 1926 |

UNITED STATES PATENT OFFICE
CERTIFICATION OF CORRECTION

Patent No. 2,960,271 November 15, 1960

Frank C. Mock

It is hereby certified that error appears in the above numbered patent requiring correction and that the said Letters Patent should read as corrected below.

Column 4, line 75, after "opening" insert -- into --.

Signed and sealed this 13th day of June 1961.

(SEAL)
Attest:

ERNEST W. SWIDER
Attesting Officer

DAVID L. LADD
Commissioner of Patents